March 31, 1970   M. GRINGRAS   3,503,790
METHOD OF MAKING SILICA BONDED TO SODIUM METASILICATE
Filed Dec. 15, 1966.   5 Sheets-Sheet 1

INVENTOR
MICHEL GRINGRAS
BY
Bauer and Seymour
ATTORNEYS

March 31, 1970   M. GRINGRAS   3,503,790
METHOD OF MAKING SILICA BONDED TO SODIUM METASILICATE
Filed Dec. 15, 1966.   5 Sheets-Sheet 2

INVENTOR
MICHEL GRINGRAS
BY
Bauer and Seymour
ATTORNEYS

March 31, 1970     M. GRINGRAS     3,503,790
METHOD OF MAKING SILICA BONDED TO SODIUM METASILICATE
Filed Dec. 15, 1966.     5 Sheets-Sheet 3

INVENTOR
MICHEL GRINGRAS
BY Bauer and Seymour
ATTORNEYS

March 31, 1970  M. GRINGRAS  3,503,790
METHOD OF MAKING SILICA BONDED TO SODIUM METASILICATE
Filed Dec. 15, 1966.  5 Sheets-Sheet 4

INVENTOR
MICHEL GRINGRAS
BY Bauer and Seymour
ATTORNEYS

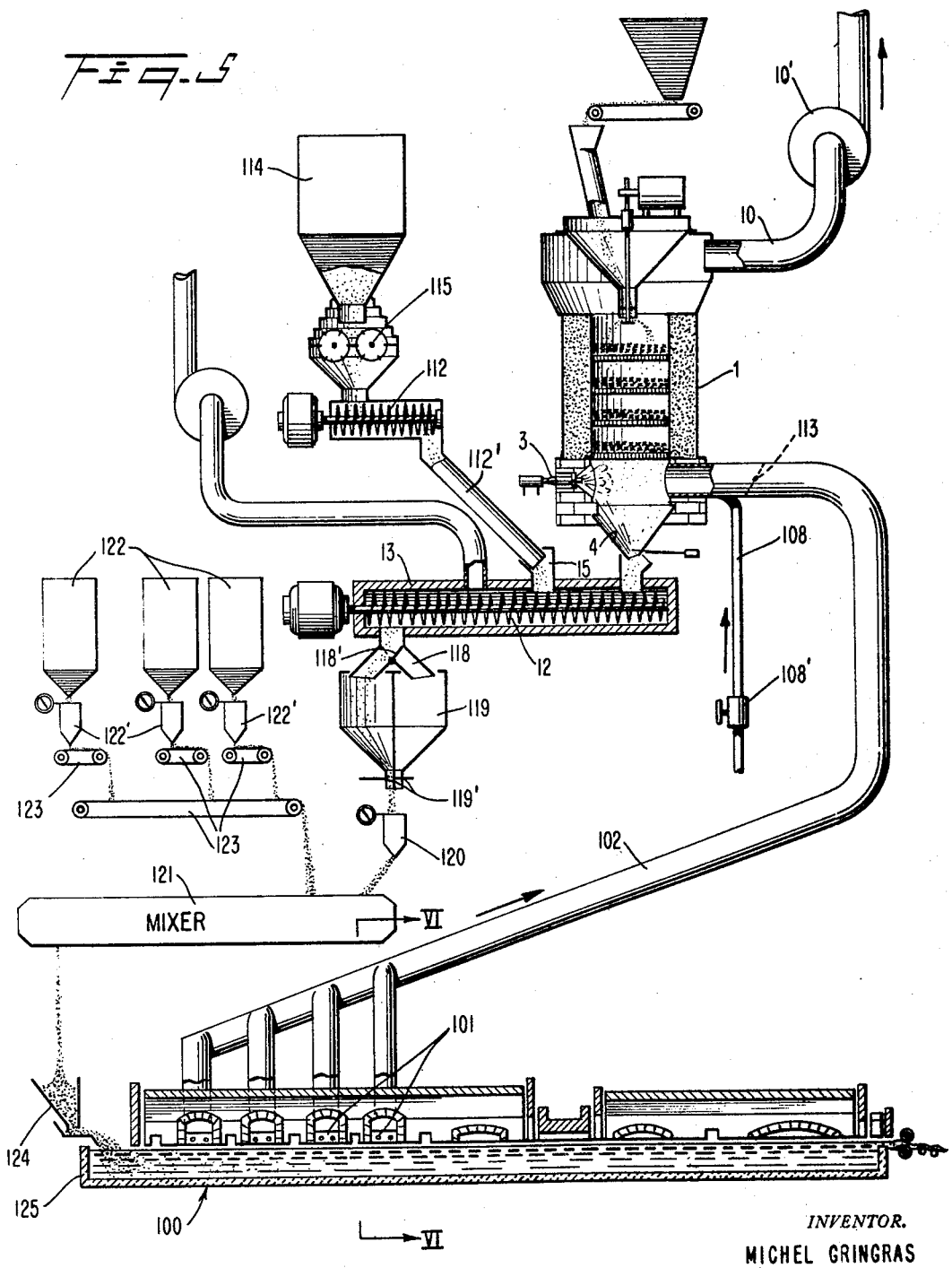

United States Patent Office 3,503,790
Patented Mar. 31, 1970

3,503,790
METHOD OF MAKING SILICA BONDED TO SODIUM METASILICATE
Michel Gringras, Bonel, France, assignor to Compagnie de Saint-Gobain, Neuilly-sur-Seine, France
Filed Dec. 15, 1966, Ser. No. 601,907
Claims priority, application France, Dec. 27, 1965, 43,817
Int. Cl. C03c 17/22, 3/04
U.S. Cl. 117—100
14 Claims

ABSTRACT OF THE DISCLOSURE

A new component for making silicate glass and certain silicates is disclosed together with a novel method of making them and novel apparatus. Silica coated with sodium metasilicate is exemplary of the novel product. These products contribute superiority to new methods of glassmaking, which are also described.

---

This invention relates ultimately to the manufacture of glass and other silicates and particularly to the manufacture of novel products which facilitate the manufacture of glass. It also relates to a novel process of manufacturing the new products. It also includes novel apparatus by which the new products may be made.

It is known that the manufacture of glass and certain other silicates may be thought of as the transformation of a heterogeneous, granular mass of raw materials such as silica, calcium carbonate, dolomite, sodium carbonate, sodium sulfate, and feldspar, into a homogeneous, vitreous mass.

Different techniques have been used to accomplish this vitrification, all of which involve heat, but the heat has been applied at different stages of manufacture and at different thermal levels. Eventually, the heat fuses the mass. The homogeneity of the final product of silicate or molten glass is obtained the more completely and rapidly as the causes of heterogeneity are reduced or eliminated during the successive meltings of the raw materials in the initial mixture. Among the causes of heterogeneity are, for example, the volatility of some raw materials, the segregation of others by reason of premature fusion, as in the case of sodium carbonate, or of certain compositions which are temporarily formed at the beginning of the fusion, as in the case of low silica silicates, or because of the appearance of low density materials which have a tendency to float, as in the case of certain allotropic types of quartz.

To reduce such difficulties it has been proposed to divide glass melting into steps. For examples, in the case of the manufacture of soda-lime glass, which is much used in windows, it has been proposed to introduce the silica and sodium as prefabricated sodium silicate, or to introduce silica, sodium, and lime at once with or without magnesia, as a fixed, prefabricated silicate. The use of such prefabricates in the manufacture of glass or other silicates is favorable to homogeneity and to an increased rate of fusion.

In the standard glass melting techniques in a tank-type furnace the temperature of the mass undergoing fusion at a given location in the furnace is never the ideal temperature for all the reactions which are simultaneously proceeding at the point. The present invention permits the use of the most favorable thermal conditions by the formation of novel preliminary products or intermediates which, when mixed and heated with the remaining elements of the glass or silicate composition, contribute improved homogeneity and frequently at a reduced expenditure of heat.

When the raw materials in the furnace, in the standard process, begin their transformations, chemical reactions occur which impose their individual characteristics of temperature, duration and the like upon the general fusion, which is usually called the melting. These chemical reactions come directly from exchanges of heat and exchanges of substance between the granular raw materials of the composition, and later between the different solid phases, or between the liquids resulting from partial fusion and the residual granular solids. It is an object of this invention to meet the requirements of rapid fusion, to carry out simultaneously the thermal exchanges and the exchanges of substance between the granular materials, that is to say to bring the raw materials in contact with each other grain by grain under the thermal conditions best calculated to assure their mutual reaction.

This principle is used in the present invention to produce an intermediate product having a core of silica and a coat of sodium metasilicate which constitutes a preferred starting material for the manufacture of glass. In this practice it is desirable but not essential to include the totality of the silica and the soda, and when desired, certain other silicates and a supplement of alkali metal compounds, alkaline earth compounds, and magnesium.

Another object is to produce these new materials in granular form for the manufacture of silicates by ignition. The products chosen to illustrate the invention are grains of silica bearing complete or partial coats of sodium metasilicate. The grains thus contain unreacted silica bonded to a surface of sodium metasilicate. Because of the coat of sodium metasilicate these grains are particularly reactive and may be used in the manufacture of sodium silicate and other silicates such as soda-lime glass to improve them and their processes of manufacture. The silica used in this invention need not be pure $SiO_2$ but may be silica as it occurs in the raw materials of nature as used in the glassmaking industry, for example sand.

The objects of the invention are accomplished generally speaking by a raw material for the manufacture of glass and metal silicates consisting essentially of grains of unreacted silica at least a portion of the surface of which is composed of sodium metasilicate; and by a method of making silica grains bonded to sodium metasilicate which comprises intermingling discrete grains comprising silica with discrete particles of sodium hydroxide at a temperature between about 300° C. and about 450° C., thereby forming silica grains coated at least in part with the metasilicate; and by a method of reacting grains comprising silica with particles comprising sodium hydroxide which comprises forming a rising current of gas at a temperature above 300° C., dropping a rain of such grains through the rising current in steps, until the temperature of the grains is sufficient to react with such particles, and mixing the hot grains with such particles; and by apparatus adapted to the manufacture of silica coated with silicate which comprises tower means, means to drop grains down through the tower means, means to flow hot gases up through the tower means, means to provide the grains with periods of free fall and periods of slower motion, reaction chamber means connected to the tower means, means to supply the reaction chamber with other finely divided materials, and means to intermix the hot grains with such materials in the reaction chamber; and by apparatus including two rotors in the reaction chamber, means to deliver hot grains to one rotor, and means to deliver a reactive fluid to the other rotor, the two rotors being so arranged that the grains projected from one mix with the fluid projected from the other; and by centrifugally projecting silica grains into contact with particulate material capable of reacting therewith at a temperature favorable to their reaction.

In the form of the invention chosen for illustration an intermediate consisting of silica coated with sodium metasilicate is produced at a temperature between about 320° and 450° C. from preheated silica sand and particulate caustic soda, the particles of which are of the same order as the sand. The caustic soda can be subdivided mechanically, physically, before or at the very moment of its contact with the silica.

The process permits material variation in its steps. According to a first mode the heat necessary to produce the reaction is imparted to the sand and carried into the reaction by it, the caustic soda at room temperature being introduced into an unheated reactor containing the sand. By preheating the sand to about 500° to 700° C. satisfactory results are achieved.

In a second mode both the sand and the caustic soda are preheated to provide the heat necessary to the reaction.

The reactor in which the reaction occurs may be heated or not depending to some extent upon its size and state of heat insulation. I have established the fact that the caustic will react with grains of silica immediately at a temperature of 320° to 450° C. when they are in a comparable state of dispersion, that is to say in particles of roughly the same size, producing a layer of sodium metasilicate which, in many cases, practically covers the unreacted silica, and that the resulting particles do not tend to agglomerate. The product appears as a whitish fluid powder of high reactivity in its intended use.

In the first mode of the process invention, solid caustic soda may be reacted with the hot sand in flakes, granules, or globules. When the second mode is employed wherein both elements are heated, the caustic soda may advantageously be melted and dispersed in droplets in the reactor.

A third mode of substantial utility employs caustic soda in aqueous solution which is sprayed into the reactor. In this case it is advisable to heat the reactor itself, the more readily and rapidly to eliminate the water by vaporization.

It is well known that sand reacts with caustic soda at about 300° C. to produce sodium metasilicate but because of the low exothermic character of the reaction, it is necessary to apply heat to keep the reaction going. This input of the necessary heat can be accomplished by preheating the sand or by heating the reactor or both.

The temperature at which the sand is heated should be chosen in the light of the form under which the caustic soda is found as well as of its temperature: Whether the caustic soda is solid at room temperature, is molten, or is in hot or cold solution and whether the solution is of greater or less concentration.

According to another characteristic of the invention the preheating of the sand is carried out continuously.

According to another characteristic of the invention the sand is preheated continuously in a packed tower through which the sand makes its way by gravity countercurrent to ascending hot gas. I have established the fact that certain types of packing are particularly favorable, among other reasons because of the moderate temperatures employed and of the flow characteristics of the sand. The packing of the heating tower may advantageously be constituted by refractory elements of regular geometric shapes such as rings, pall rings, and other shapes which permit the sand to trickle downward through the interstices. Other examples are irregular shapes and large steel turnings. Ceramic materials are satisfactory for the packing. The packed towers are particularly advantageous for sand because they considerably reduce the size of the apparatus. The packing rings can fill the whole tower but it is advantageous to distribute the packing in separated layers on perforated plates or on grates. This provides progression in steps of alternate turbulent free fall and trickling motion. By extending the thickness of the packing in each or in certain layers, the duration of exposure to the hot gases may be increased, precisely producing sand at whatever temperature is most advantageous.

Several forms of apparatus for carrying out the invention are illustrated in the accompanying drawings:

FIG. 5 is a view partly in section, of glass-making apparatus wherein sand grains are coated with sodium metasilicate and directly deposited into a glass-making furnace for processing therein; and FIG. 6 is a detail sectional view to an enlarged scale, taken in a plane identified by line VI—VI, FIG. 5.

All the figures are in vertical section.

Figure 1:
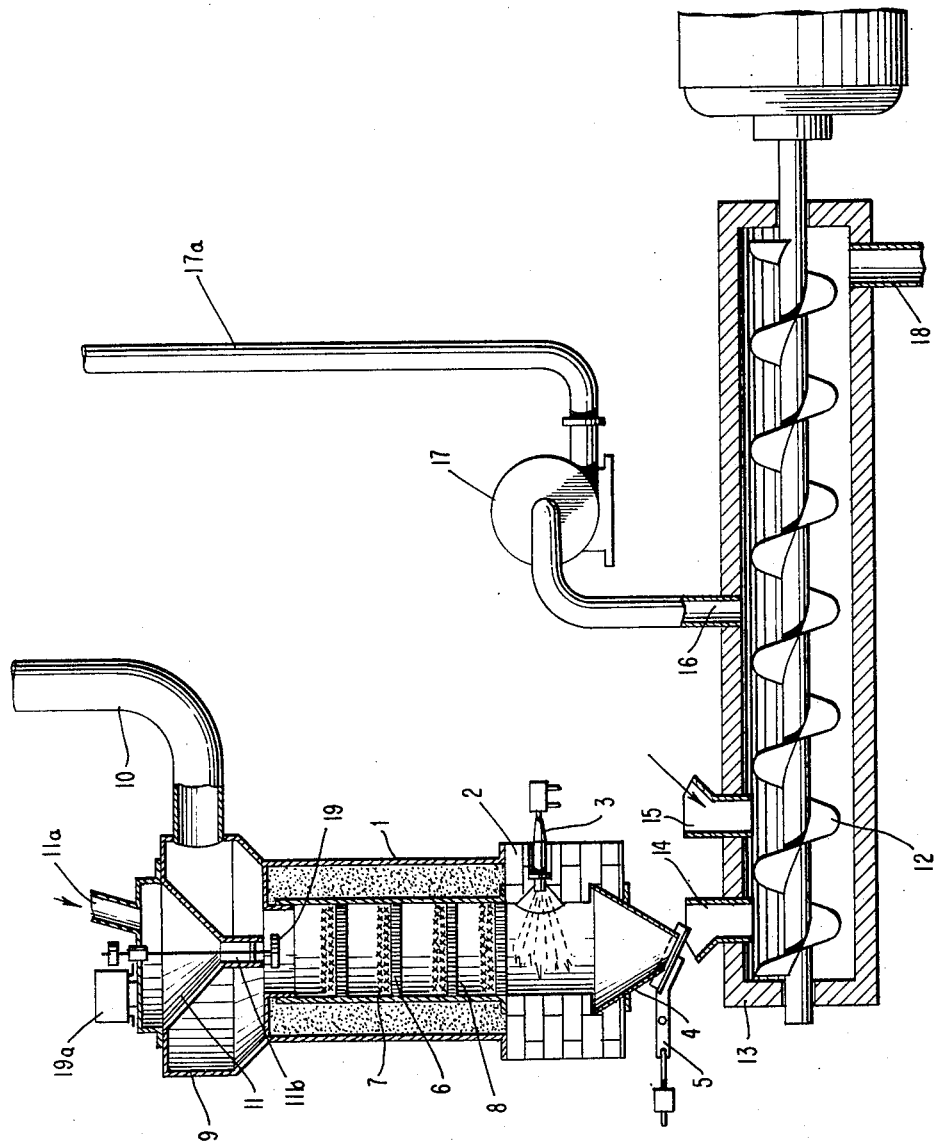
FIG. 1 is a vertical section through a first form of apparatus for carrying out the invention in which the entire heat necessary for the reaction is carried into the reaction chamber by the sand.

The installation of FIG. 1 includes a tower 1 for preheating the sand and a reactor 13 in which the reaction of the hot sand with solid caustic soda takes place. The preheating tower is composed of an insulated cylinder which rests on a masonry base 2 which constitutes a fire pit into which one or more burners 3 discharge. The tower is provided with perforated plates or grilles 6 each of which carries a load of packing 7 which is made up of Rashig rings, pall rings, or the like. This tower may also include above the packed rings one or more grids or grilles which are without packing and which break up any agglomerates or lumps of the raw material, which sometimes occurs when the humidity level in the material is so high as to prevent a regular and free fall throughout the whole section of the tower.

Between the grilles 6 a free space 8 is provided to establish turbulence of the falling grains in the rising hot gases, which improves the heat exchange between the gases and the sand. Sand is supplied to the tower by a hopper 11 which receives the sand by the orifice 11a and discharges it to the top of the tower through the orifice 11b, the opening of which is controlled by a valve 19 operated by a motor 19a. This valve prevents air from entering the tower and disturbing the pressure conditions existing in the cyclone 9. This cyclone encircles the hopper and reduces the velocity of the hot gas, permitting any ultrafine particles carried in its ascending currents to drop out before the gas itself is evacuated through suction line 10. The suction may be established at any degree, or lack of it, which contributes to the efficient function of the apparatus. As stacks and aspirators for such purposes are well known, they will not be described.

The cold sand admitted at the top of the tower is distributed from wall to wall by the upper grilles and falls from grille to grille in alternate turbulent free fall and tricking motion through the packing, acquiring increased heat as it progresses downward. The hot sand falls through the fire chamber 2 into the hopper 4 from which it can be discharged by pivoting the gate 5 which is opened from time to time to discharge sand through port 14 into the reaction chamber 13. This is provided with a screw conveyor 12, with an orifice 15 for the admission of other reactants, for instance sodium hydroxide in flakes, and with a gas-escape flue 16 served by an aspirator pump 17 and a stack 17a. The reaction chamber is a horizontal tube which is insulated against loss of heat. The reaction between the hot sand and the cold sodium hydroxide releases water vapor which is drawn off through the aspirator. A screw conveyor also acts as an agitator to mingle the hot sand with the caustic soda flakes, which melt in contact with the sand and are distributed throughout it, wetting the grains and coating them with a film which reacts superficially with the silica producing sodium metasilicate. This is a product characteristic of the invention which retains its own character and granulometry and is moved continuously toward a discharge orifice 18 by the conveyor 12.

The product issuing from the reactor is discharged toward storage or directly to the raw materials room of a glass or silicate plant.

Figure 2:
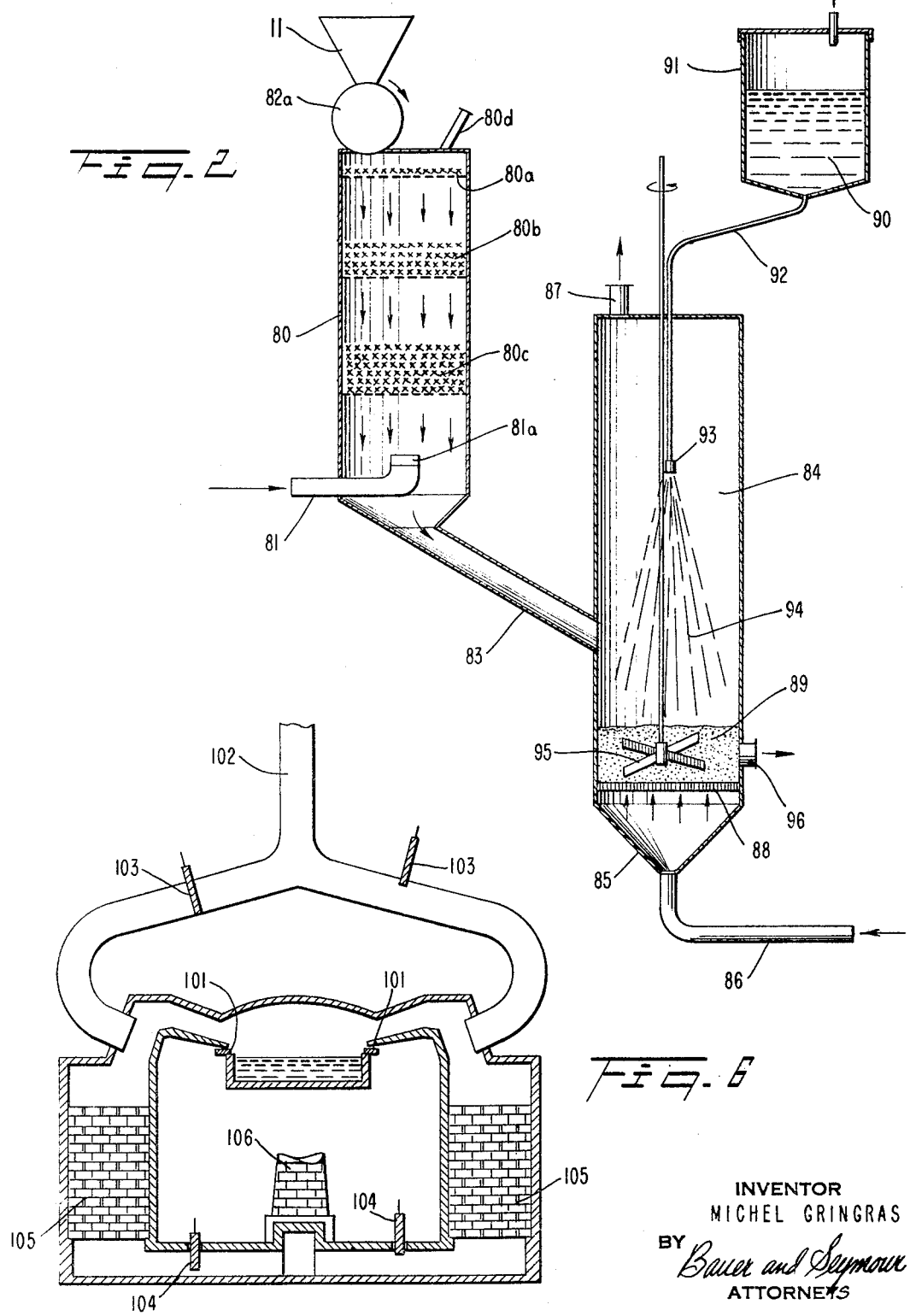
FIG. 2 is a modified form of the apparatus in which part of the heat is carried to the reaction by the sand and part by the caustic soda, which is introduced in solution or in molten condition.

In FIG. 2 there is a modification of this apparatus and of this process. Process-wise the installation uses an aqueous solution of caustic soda 90 which is kept in a reservoir 91 and is supplied through a discharge tube 92 to a spray head 93 inside the reaction chamber 84. The spray covers the whole surface of the mass. Sand grains 89, which are derived from conduit 83, are agitated by rotor 95 and are kept in a fluidified condition by hot gas, for instance hot air, arriving through conduit 86 and conical base 85 of the reaction chamber, and which forces its way upward through grille 88, and is drawn off after flowing upward through the reaction chamber, through aspirator port 87. The product of reaction is similar to that which has been described hereinabove and is drawn off through discharge port 96. The sand is received in a novel hot tower 80 through a hopper 11 and a rotary valve 82a of ordinary construction. The tower is packed in layers of increasing thickness, the top layer 80a being thin and serving to achieve equal distribution rather than to retard the fall of the sand grains. The next level 80b has a thicker layer of packing which materially increases the time required for the grains to trickle from the top of the packing through the grille. The third layer 80c is of further increased thickness which further increases the time required to pass through the packing. From this layer the sand passes through conduit 83 to the reaction chamber. The gases enter the tower through pipe 81 and are burned in burner 81a. A controlled aspirator like 80d controls the proportion of hot gases from burner 81a which pass upward through the tower and downward through the conduit 83, and also controls the flow of gases from pipe 86 through the reaction chamber 84. The agitator 95 not only provides intimate agitation of the reactants but prevents the formation of agglomerates and assists the discharge.

In this form of the invention part of the heat necessary to the reaction is imparted by the sand and the remainder is supplied by the hot air in the reactor. The total quantity of heat supplied will be made sufficient to vaporize the water in the caustic solution. The reaction in the fluidized zone takes place at about 350° C. and is very rapid.

This installation has operated satisfactorily with an aqueous solution containing 50 to 70% by weight of caustic soda. The temperature of the sand as it enters the reactor is about 650° C.; the temperature of the air admitted through pipe 86 is about 600° C. The heat exchanges in the fluidized bed are so rapid that there is an almost instantaneous evaporation of the water in the caustic soda, this evaporation being further favored by the great surface of exchange being offered by the sand grains. The spray cone 94 totally prevents the escape of fine particles.

Figure 3:
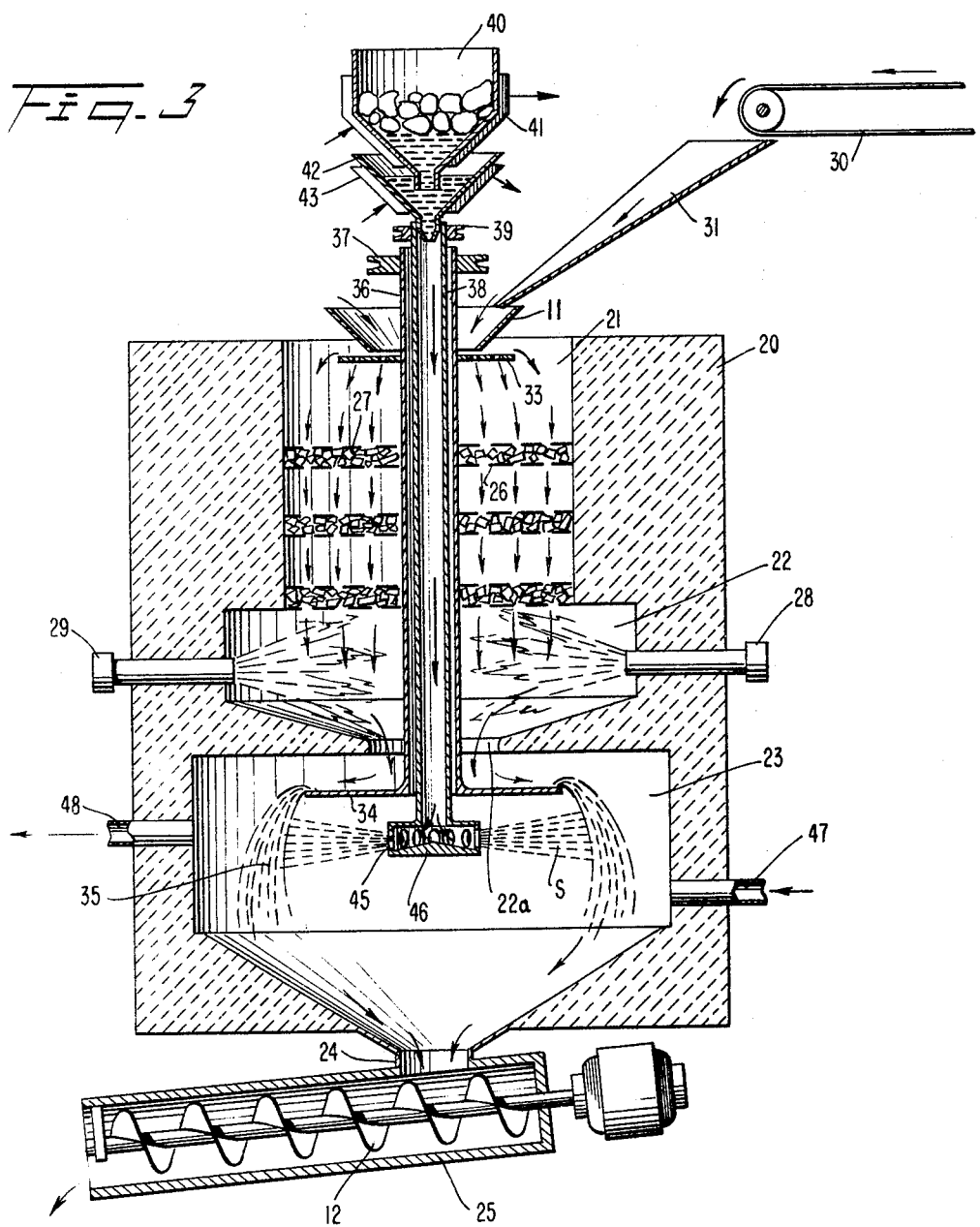
FIG. 3 illustrates apparatus operating by double centrifuge.

In the apparatus and process of FIG. 3 the heat necessary to the reaction is partly imported by the sand and partly by molten caustic soda. The reactor 20 is heavily insulated and includes the heating tower 21, a fire chamber 22 which is heated by burners 28, 29, and a reaction chamber 23 through which a current of dry air, heated or not, can be made to flow from port 47 to port 48 through the reaction elements, picking up gases of reaction, such as water vapor, on the way. The hot tower 21 is provided with packing layers 26, 27 similar to 6, 7 of FIG. 1. An insulated cover may be provided for the tower but is not necessary to description of the novelty. The sand is brought by a conveyor 30 to a chute 31 and delivered to a funnel 11 centrally located in the hot tower. The caustic soda is received in a hopper 40 and melted by heat derived from jacket 41. The molten caustic flows into a funnel 42 which is maintained at a temperature sufficient to keep the caustic molten by heat derived from jacket 43. The orifice of the funnel discharges into a rotary tube 38 which carries at its lower end a centrifugal spinner 46 having vertical walls 45 which are perforated with a multitude of holes of fine or coarse dimension, as desired, varying in diameter from a few microns to several millimeters. The bottom of the centrifugal rotor 46 is conical to retain the molten caustic soda which drops downwardly from the outlet orifice of funnel 42 and flows outward against the inner faces of wall 45 under centrifugal force. The centrifugal force is obtained by rotating the tube 38 by means of a pulley 39 driven at any suitable speed by a variable source of power not shown. The centrifugal force will compel the molten sodium hydroxide to cover the entire inner wall of the centrifugal rotor and to make its way outward through the multitude of holes provided in its surface, being projected as a spray S with sufficient velocity to reach and penetrate the curtain 35 which is formed by the particles of sand.

The sand from the funnel 11 falls upon a rotating plate 33 which is provided with perforations and makes its way through the perforations and out beyond the edge of the plate so as to eventually cover the upper packing layer. The plate 33 is mounted on a rotary tube 36 which is coaxial with tube 38 and which is driven by a pulley 37 from the same source which drives pulley 39 or from a different source. In general the speed of rotation of tube 36 may be less than that of tube 38. The sand makes its way down through the turbulent spaces between the packing layers and through the packing layers as described in connection with FIG. 1, being heated by hot gases arising from burners 28, 29. The bottom of fire chamber 22 is conical and the falling hot sand slides down it to the discharge opening 22a from which it falls upon a perforated or imperforate plate 34 from the edge of which it falls with parabolic motion into the stream S of molten sodium hydroxide particles which are projected outward from the spinner 46. The sand attains a temperature of 500° to 600° C. on the rotary disk 34 and may be assumed to be in the vicinity of that temperature as it falls in the curtain 35. The water resulting from the reaction is carried off by the current of dry air which passes from 47 to 48 through the reaction chamber.

The product, unreacted silica, is enrobed by complete or partial coats of sodium metasilicate being formed in the atmosphere of the combustion chamber. The formation occurs practically instantaneously upon contact of the sprayed particles of sodium hydroxide with the sprayed particles of sand; the particles retain their identities, there is substantially no agglomeration, and, if any of the caustic soda passes through the sand without encountering a grain, it falls into the conical bottom of the reaction chamber where it mixes with sand grains and completes its reactional function. Thus, the product which falls through outlet 24 into insulated chamber 25, which contains screw conveyor 12, has already largely completed its reaction, any uncompleted particles being reacted before they pass out of the chamber 25.

Figure 4:
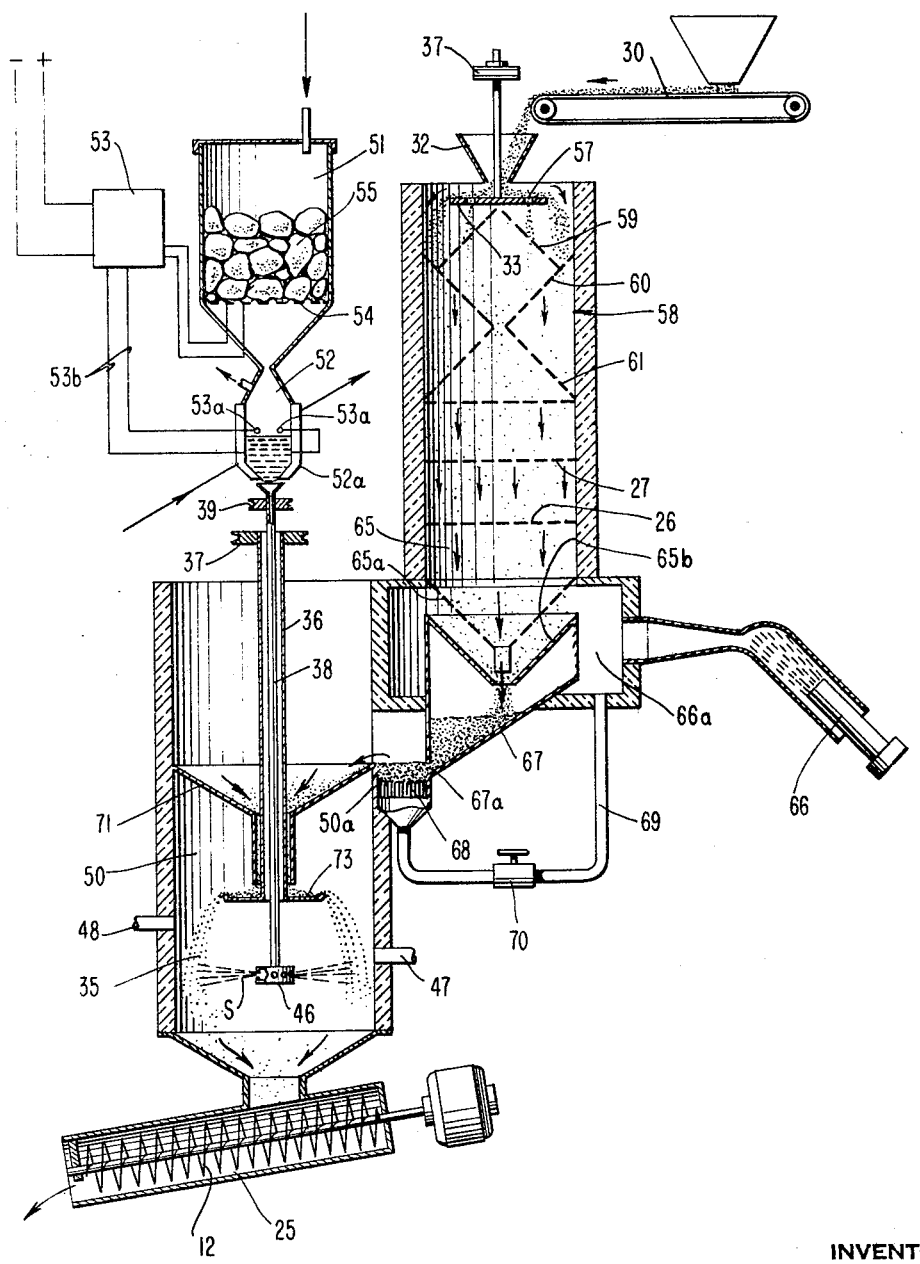
FIG. 4 shows a modified apparatus embodying principles of FIG. 3 and FIG. 2.

In FIG. 4 is illustrated a modification of the apparatus of FIG. 3 embodying a reaction chamber 50 which is separated from the hot tower in which the grains of sand are heated. Where construction is similar, similar numbers have been used and parts already described will not be described again. The receptacle 51 for solid caustic soda 55 is provided with an electrically heated grid 54 which receives its power from a source 53 through unnumbered lines. The source includes an on-off relay which is operated through lines 53b by contacts 53a located in a receptacle 52 which is heated by jacket 52a. When the level of molten sodium hydroxide reaches the contacts 53a, the relay breaks the circuit which heats the grille 54 and when the level of molten caustic in the receptacle falls below the contacts, the relay energizes the grille to melt more sodium hydroxide. From receptacle 52 the sodium hydroxide passes through a tube 38 to the rotor 46 from whence it is sprayed as described above into the bottom of the reaction chamber.

The sand is admitted at the top of the tower 58 where it is centrifugally distributed to the surface of perforated cones 59, 60, 61, falling from thence on the packed grilles of construction similar to those already described, which are indicated only schematically. From the lowest of these layers of packing the sand falls through chamber section 65 of the tower, upon the perforated conical bottom 65a of the tower, the perforations of which permit the hot gases from burners 66 and combustion chamber 66a to mount through the descending sand. Sand which falls through the perforations of the cone is caught on an imperforate cone 65b and enters hopper 67 from whence it passes by an orifice 67a to a chamber having a perforate bottom 68 through which combustion gases arrive from chamber 66a through lines 69 and valve 70, passing upward through the grains and keeping them fluidified. As they attain the level of wall 50a, they flow into a funnel 71 and are thence discharged to rotary disk 73 which is mounted on the shaft 36. The curtain of sand 35 falls with parabolic trajectory into the spray S from the centrifugal distributor 46 where the same reaction occurs which has been described hereinabove.

The apparatus of FIGS. 3 and 4 is useful not only for the particular process which has been described herein but for many other processes for which reaction between particulate materials occurs in a suitable atmosphere. The sand from the distributor 68 may be on the order of 600° C.

EXAMPLE

This example applies to an installation of the type represented in FIG. 1.

The tower 1 was composed of a cylindrical shaft well insulated against heat loss, 25 cm. in diameter and 150 cm. high. The grilles 6 supporting the packing 7 were 25 cm. About the packings were pall rings of 25×25 mm. and they formed a bed 15 cm. thick on each grille, leaving a free space 8 of about 10 cm. The burner 3 was supplied by 9 m.³ per hour of illuminating gas providing heat of 4000 kcal. The air was drawn in through the conduit 16 at 1000 m.³ per hour. The sand, at a temperature of 25° C. and a granulometry of 150–400 microns, was introduced at the top of the tower at 180 kg. per hour. The sand was revieved at the bottom of the tower at 750° C. and was put periodically into the reactor, which also received 45 kg. per hour of caustic soda flakes at 20° C. These flakes also contained 1.6% $Na_2CO_3$, 2.8–2.9% NaCl, 0.1% $Na_2SO_4$, 5 p.p.m. Al, 45 p.p.m. Fe, 60 p.p.m Ca, and 30 p.p.m. $SiO_2$.

The reactor 13 was a U-shaped trough 29 cm. high, of a cylindrical radius of 12 cm., and a length of 140 cm.

The product was composed of sand grains coated with sodium metasilicate and they issued from the apparatus at about 450° C. The structure of the product was studied by X-ray diffraction according to the method of Debye and Scherrer under radiation of 1.5405 A. (radiation Cu-K α). The results of this study are found in the following table:

TABLE

| Interreticular Distance, d A. | Intensity of the Point, $I/I_0$ | $SiO_2$ Quartz α | Sodium Metasilicate | |
|---|---|---|---|---|
| | | | $SiO_2$ | $Na_2O$ |
| 4.26 | 35 | X | | |
| 3.56 | 20 | | X | |
| 3.34 | 100 | X | | |
| 3.04 | 100 | | X | |
| 2.57 | 48 | | X | |
| 2.46 | 12 | X | | |
| 2.40 | 64 | | X | |
| 2.26 | 12 | X | X | |
| 2.24 | 6 | X | X | |
| 2.13 | 9 | X | X | |
| 1.98 | 6 | X | | |
| 1.88 | 28 | | X | |
| 1.81 | 17 | X | | |
| 1.75 | 40 | | X | |
| 1.67 | 7 | X | X | |
| 1.54 | 15 | X | X | |
| 1.45 | 3 | X | | |
| 1.42 | 40 | | X | |
| 1.38 | 7 | X | X | |
| 1.375 | 10 | X | X | |
| 1.372 | 9 | X | X | |
| 1.291 | 3 | X | X | |
| 1.256 | 5 | X | | |

These results show that the product is exclusively composed of silica which has not reacted and sodium metasilicate, the product of reaction. The two materials are so interconnected in every grain that under the microscope one cannot distinguish the limits of separation between the region formed of unreacted silica and the region formed of sodium metasilicate.

The novel raw materials are used in glassmaking with astonishing savings in melting time and heat. This portion of the invention is represented in FIGS. 5 and 6, showing an industrial plant for making glass in accordance with the invention, the gases from the glass furnace being used to heat the sand before its reaction with the sodium hydroxide.

A glass furnace 100 is heated by burners 101. The gases of combustion are evacuated by conduits 102. Dampers 103, 104, FIGURE 6, are manipulated so as to distribute the hot gas between the preheating tower 1 and the regenerators 105. That portion which passes through the regenerators is discharged to the air through chimney 106 at lower temperature. The direction of the flames is periodically reversed to permit the use of the heat trapped in the regenerators. The hot gases enter the conduit 102 at about 1200°–1300° C. As it may be unnecessary to employ such a temperature to heat the sand, its temperature is adjusted by mixing it with cold air through a pipe 108 and a valve 108′, reducing its temperature at the bottom of the tower to about 750° C. for many operations. A burner 3 at the base of the tower is not used unless one wishes to make sand grains coated with metasilicate when the furnace is not working. The gases, after having heated the sand, escape through discharge or suction pipe 10, the draft of which is controlled by a blower 10′. A damper 113 near the discharge end of pipe 102 controls the flow of hot gas from the furnace and the degree of vacuum, or draft, established in the tower.

Caustic soda in flakes is stored in a bin 114 from whence it passes through a breaker 115, which breaks up any lumps which have formed during storage, and is then transported to the reactor 13 by means of screw conveyor 112 and a chute 112′. The temperature in the reactor is maintained between 320° and 450° C. by controlling the temperature of the sand which enters it. The grains of silica-sodium metasilicate (sand coated with metasilicate) fall from the discharge end of the reactor through a split chute 118, the direction of discharge of which is controlled by a pivoted vane 118′. The bin 119 is divided into sections so that one may be filling while the other is discharging. Valves 119′ control the passage of silica metasilicate grains toward a balance 120, from whence the silica metasilicate goes to a mixer 121 which receives other raw materials of glassmaking grade from bins 122, balances 122', and conveyors 123, the operation of which will be reasonably apparent to skilled persons. From the mixer 121 the batch or composition, as it is called, goes to a hopper 124 from whence it is fed at a controlled rate into a doghouse 125 of the furnace.

In order to make a glass having the following composition in weight percent: $SiO_2$, 72; $Na_2O$, 14; CaO, 8; MgO, 4; $Al_2O_3$, 2; the following batch was prepared, in parts by weight:

| | |
|---|---|
| Sand-sodium metasilicate | 675 |
| Sand | 13 |
| Sodium sulfate | 6.6 |
| Limestone | 135 |
| Dolomite | 64 |
| Feldspar | 38 |
| Cullet | 200 |

The analysis of an average sample of the silica-sodium metasilicate showed that this product contained 83% $SiO_2$ and 17% $Na_2O$. 13 kg. of pure sand were added to bring the contents of silica and soda to those necessary to the operation.

It was an astonishing result of this invention that by replacing silica and sodium carbonate, which are customarily used in this composition, with sand-sodium metasilicate, the productivity of the furnace, its output per unit of time, was increased from 10 to 16%, and the temperature in the interior of the furnace was substantially lowered with a substantial saving of heat and reduction of wear on the furnace. Reductions of temperature of 100° C. to 200° C. have been achieved.

The same apparatus is used to make polysilicates by fusing the appropriate ingredients. It should be understood that only the grains of sand-metasilicate are melted in the furnace, with or without the addition of pure sand when it is necessary to adjust the contents of silica and soda in the sodium polysilicate constituting the product. In this case also there is an astonishing increase in the productivity of the furnace, which has been increased from 30 to 60% while the temperature within the furnace has been lowered from 200° to 100° C. depending upon what product is being prepared. Similar reductions in temperature have been achieved in glassmaking.

The following novel concepts are found in this application:

A novel industrial product which facilitates the manufacture of glass and other silicates;

A process of making these new products including developments contributing to the most efficient use of heat;

Apparatus for carrying out the manufacture of the new products by the new process in which both reactants are in solid state, in which one reactant is soild and one molten, and in which one is solid and one in solution;

Apparatus for producing the novel product by the novel process by intermixture on a support and by intermixture and reaction in the air;

Apparatus employing fluidification to facilitate the reaction;

Apparatus employing centrifugal dispersion of both components resulting in engagement and reaction in the surrounding atmosphere;

Determination of preferred operating conditions for all types of processes;

Methods and apparatus of preheating the sand and for controlling its flow while it is being heated;

Apparatus which controls the supply of raw materials automatically;

Apparatus for supplying caustic soda including it in the solid state, the molten state, and in solution; and Control of the atmosphere within the heating and reaction chambers.

As many apparently widely different embodiments of the present invention may be made without departing from the spirit and scope thereof, it is to be understood that the invention is not limited to the specific embodiments.

What is claimed is:

1. A method of making silica grains bonded to sodium metasilicate which comprises intermingling discrete grains comprising silica with discrete particles of sodium hydroxide, the particles size of the two reagents being of the same order, at a temperature between 300° C. and 450° C. thereby forming silica grains coated at least in part with sodium metasilicate.

2. A method according to claim 1 in which the silica grains are sand, in which the sand is preheated to a temperature of about 500° C.–700° C., and is mixed with the sodium hydroxide particles, added at room temperature.

3. A method according to claim 2 which comprises dispersing the sand in air, liquefying the sodium hydroxide, and spraying the liquid sodium hydroxide into contact with the dispersed sand in the air.

4. A method according to claim 1 in which both the discrete grains and the hydroxide are preheated, and are dispersed in the air and into contact with each other.

5. A method according to claim 2 which comprises forming an aqueous solution of the sodium hydroxide, and reacting the sand with particles of said aqueous solution by spraying said aqueous solution into contact with the sand grains dispersed in air.

6. The method of claim 1, said discrete particles of sodium hydroxide being in solid state.

7. The method of claim 6, the solid discrete particles of sodium hydroxide being at ambient temperature when intermingled, said discrete grains of silica being preheated before intermingling, to about 500° to 750° C., to thereby supply heat for reaction.

8. The method of claim 1, said grains of silica being preheated by releasing a dispersed stream of said grains for free fall in and through a confined rising column of heated gas.

9. The method of claim 1, said discrete particles of sodium hydroxide being in the state of molten droplets.

10. The method of claim 9, said molten droplets of sodium hydroxide being at about 320° to 450° C. when intermingled, to thereby supply in part the heat for reaction.

11. The method of claim 1, said discrete particles of sodium hydroxide being in the state of droplets of an aqueous solution thereof.

12. The method of claim 11, said droplets of sodium hydroxide being introduced at the top of a confined rising column of heated gas, under pressure, said discrete grains of silica being preheated and introduced into the column of rising gas at about midway of its height, to there intermingle and react with the descending droplets of sodium hydroxide, to form grains of silica enrobed with a coating of sodium metasilicate, said enrobed grains being maintained in fluidized state by the rising current of heated gas under pressure, and removing the formed grains from the fluidized bed.

13. A method of reacting grains comprising silica, with particles of sodium hydroxide which comprises forming a confined rising current of gas at a temperature above 300° C., releasing a dispersed stream of said silica grains to drop by gravity in a series of free falls interspersed by periods of reduced rates of descent through said rising current of gas, to thereby elevate the temperature of the grains to react with said particles of sodium hydroxide, and thereafter mixing the heated grains with said particles, at reaction temperature.

14. A method according to claim 13 in which the sodium hydroxide is projected in discrete particles into contact with the falling grains of heated silica at reaction temperature, and removing the reaction product in discrete particles as formed.

(References on following page)

References Cited

UNITED STATES PATENTS

| | | | |
|---|---|---|---|
| 1,861,711 | 6/1932 | Moreton | 23—182 X |
| 2,743,196 | 4/1956 | Robinson | 117—118 X |
| 2,832,473 | 4/1958 | Oberholtzer | 117—100 X |
| 2,955,336 | 10/1960 | Horn et al. | 117—100 X |
| 3,074,802 | 1/1963 | Alexander et al. | 117—100 X |
| 3,208,822 | 9/1965 | Baker et al. | 117—100 X |
| 3,356,449 | 12/1967 | Shoaff | 23—182 |

FOREIGN PATENTS 192,589  11/1907  Germany.

WILLIAM D. MARTIN, Primary Examiner

M. R. P. PERRONE, Jr., Assistant Examiner

U.S. Cl. X.R.

23—182; 106—52; 117—118, 123, 169; 263—21